(12) United States Patent
Gupta

(10) Patent No.: US 10,970,067 B1
(45) Date of Patent: Apr. 6, 2021

(54) DESIGNING MICROSERVICES FOR APPLICATIONS

(71) Applicant: Dell Products L.P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/662,908

(22) Filed: Oct. 24, 2019

(51) Int. Cl.
*G06F 8/76* (2018.01)
*G06F 8/20* (2018.01)
*G06F 9/54* (2006.01)
*G06F 8/36* (2018.01)

(52) U.S. Cl.
CPC .................. *G06F 8/76* (2013.01); *G06F 8/20* (2013.01); *G06F 8/36* (2013.01); *G06F 9/546* (2013.01)

(58) Field of Classification Search
CPC ... G06F 8/76; G06F 8/36; G06F 9/546; G06F 8/20
See application file for complete search history.

(56) References Cited

U.S. PATENT DOCUMENTS

| 10,579,370 | B2 | 3/2020 | Gupta | |
|---|---|---|---|---|
| 2003/0023957 | A1* | 1/2003 | Bau, III | G06F 8/20 717/140 |
| 2005/0278183 | A1* | 12/2005 | Ammons | H04L 41/0896 703/22 |
| 2017/0063833 | A1 | 3/2017 | Colle et al. | |
| 2019/0104184 | A1* | 4/2019 | Gao | H04L 67/16 |
| 2019/0108067 | A1* | 4/2019 | Ishikawa | H04L 41/50 |
| 2019/0250912 | A1 | 8/2019 | Gavisiddappa Kodigenahalli et al. | |
| 2020/0042315 | A1 | 2/2020 | Gupta | |

FOREIGN PATENT DOCUMENTS

WO   2017034789 A1   3/2017

OTHER PUBLICATIONS

"Functionality-oriented Microservice Extraction Based on Execution Trace Clustering", Jin et al., 2018 IEEE International Conference on Web Services, 2018 IEEE (Year: 2018).*

(Continued)

*Primary Examiner* — Daxin Wu
(74) *Attorney, Agent, or Firm* — Ryan, Mason & Lewis, LLP

(57) ABSTRACT

A method includes identifying an application to be converted into a set of microservices, analyzing software code of the application to identify a plurality of functions as candidates for combination with one another into the set of microservices, monitoring a running instance of the application to generate a calling-context tree identifying interactions among the plurality of functions, and determining a recommended design for the set of microservices based at least in part on the identified interactions among the plurality of functions. The method also includes modifying the recommended design for the set of microservices responsive to activation of user interface features of a graphical user interface providing a visualization of the generated calling-context tree, and generating the set of microservices based at least in part on the modified design.

20 Claims, 12 Drawing Sheets

(56) References Cited

OTHER PUBLICATIONS

"Visualization Tool for Designing Microservices with the Monolith-first Approach". Nakazawa, et al., 2018 IEEE Working Conference on Software Visualization, 2018 IEEE (Year: 2018).*
springboottuttorial.com, "Breaking a Monolith into Microservices—Best Practices and Challenges," https://www.springboottutorial.com/breaking-a-monolith-into-microservices, Feb. 18, 2019, 8 pages.
S. Bhaskaran, "Migrating Monolithic Applications to Microservices," https://dzone.com/articles/migrating-monolithic-applications-to-microservices, Jan. 7, 2018, 3 pages.
nginx.com, "Refactoring a Monolith into Microservices," https://www.nginx.com/blog/refactoring-a-monolith-into-microservices/, Mar. 8, 2016, 10 pages.
cloud.google.com, "Migrating to Microservices from a Monolithic App," https://cloud.google.com/appengine/docs/standard/go/microservice-migration, Oct. 16, 2019, 2 pages.
martinfowler.com, "How to Break a Monolith into Microservices," https://martinfowler.com/articles/break-monolith-into-microservices.html, Apr. 24, 2018, 10 pages.
docs.aws.amazon.com, "Create a Simple Microservice Using Lambda and API Gateway," https://docs.aws.amazon.com/lambda/latest/dg/with-on-demand-https-example-configure-event-source_1.html, 2019, 3 pages.
U.S. Appl. No. 16/054,285, filed Aug. 3, 2018 and entitled "Method to Disintegrate a Monolith Service to Microservices."

* cited by examiner

DESIGNING MICROSERVICES FOR APPLICATIONS

FIELD

The field relates generally to information processing, and more particularly to techniques for managing microservices.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. In some cases, containers are used to provide microservices in the given cloud-based information processing system. However, significant challenges can arise in the management of microservices in cloud-based information processing systems.

SUMMARY

Illustrative embodiments of the present disclosure provide techniques for designing microservices for applications.

In one embodiment, a method comprises identifying at least a portion of an application to be converted into a set of microservices, analyzing software code of the application to identify a plurality of functions as candidates for combination with one another into the set of microservices, monitoring a running instance of the application to generate a calling-context tree identifying interactions among the plurality of functions, and determining a recommended design for the set of microservices based at least in part on the identified interactions among the plurality of functions, the design for the set of microservices comprising a first microservice comprising a first subset of the plurality of functions and at least a second microservice comprising a second subset of the plurality of functions. The method also comprises modifying the recommended design for the set of microservices responsive to activation of user interface features of a graphical user interface providing a visualization of the generated calling-context tree, and generating the set of microservices based at least in part on the modified design. The method is performed by at least one processing device comprising a processor coupled to a memory.

These and other illustrative embodiments include, without limitation, methods, apparatus, networks, systems and processor-readable storage media.

DETAILED DESCRIPTION

Figure 1:
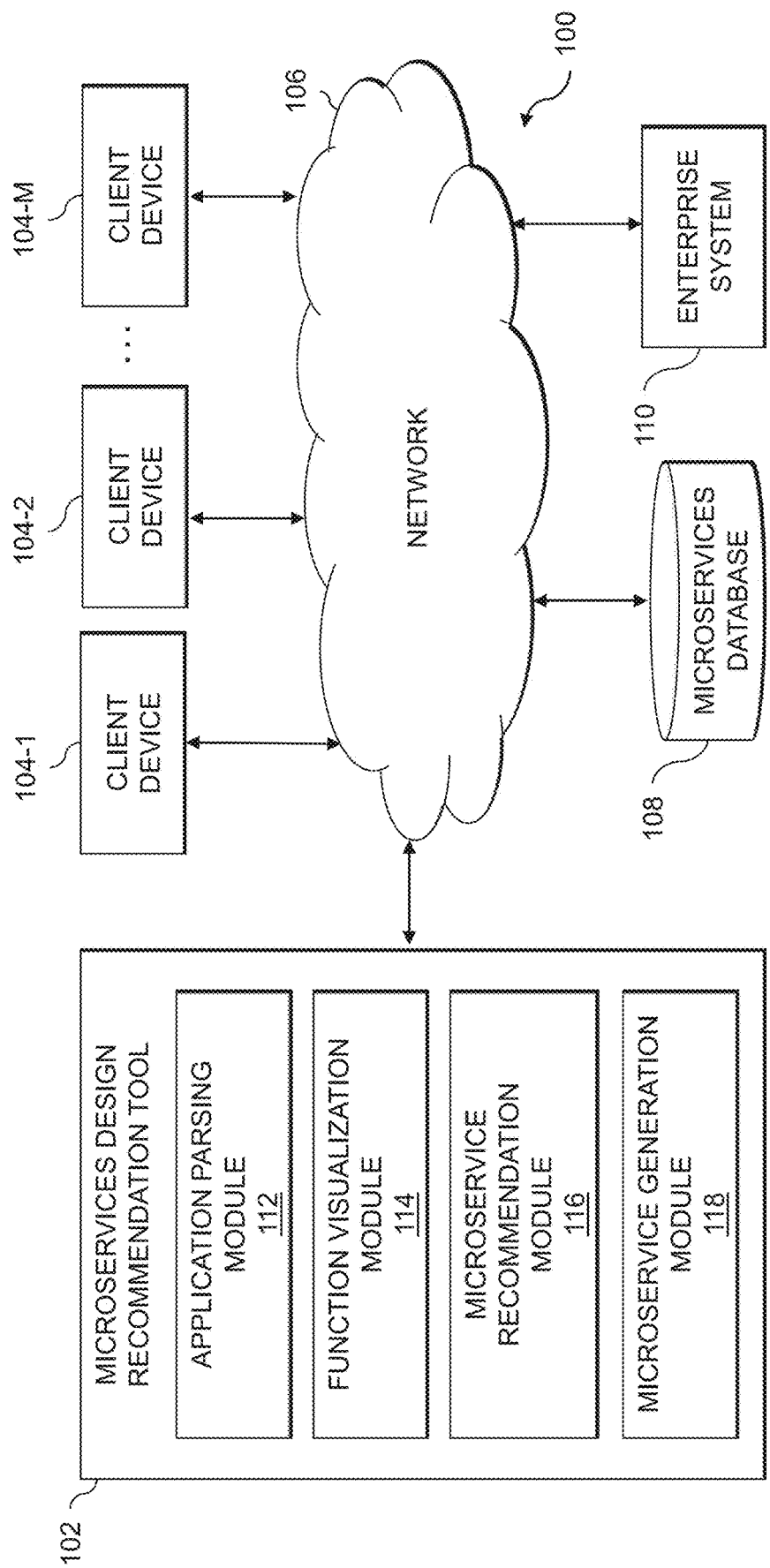
FIG. 1 is a block diagram of an information processing system for designing microservices for applications in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Software architecture may be designed in various ways. In some architectures, software may provide a number of functions in the form of a single, monolithic application. A "monolithic" application refers to a single-tiered, tightly-coupled software application in which various elements of the software architecture (e.g., a user interface, database access, processing logic, etc.) are combined into a single program, usually on a single platform. In software engineering, a monolithic application describes a software application that is designed without modularity. In general, modularity of software elements in a software architecture is desirable, as modularity supports reuse of portions of application logic while also enabling efficient maintenance and development (e.g., by enabling repair and replacement of parts of an application without requiring upgrading the entire application).

Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. In some embodiments, as will be described in further detail below, a microservice is formed by grouping together "nanoservices" to implement some functional capability. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. Large, monolithic applications can be decomposed or disintegrated into sets of small independent and composable services, referred to herein as nanoservices. A nanoservice refers to a service that can be broken down into very small pieces, though not all small pieces of code are nanoservices. Nanoservices are deployable, reusable and useful. When a service or a method does not call other internal methods but calls an external service, such as a web service or a database interface, it may be considered as a nanoservice. A number of nanoservices may be grouped according to various characteristics (e.g., a common keyword in method or other function name) to form a microservice.

A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

FIG. 1 shows an information processing system 100 configured in accordance with an illustrative embodiment. The information processing system 100 is assumed to be built on at least one processing platform and provides functionality for designing microservices for cloud native applications by automatically generating microservices designs for disintegrating monolithic applications into sets of microservices. Advantageously, this requires less effort, time and resources than manually designing microservices for monolithic applications or maintaining monolithic applications.

The information processing system 100 includes a microservices design recommendation tool 102, which is coupled via a network 106 to an enterprise system 110. The enterprise system 110 is assumed to be accessed, over network 106, by client devices 104-1, 104-2, . . . 104-M (collectively, client devices 104). The system 100 also includes a microservices database 108 coupled to the network 106, which may store various information related to the design of microservices for applications hosted by assets of the enterprise system 110. The assets may include, by way of example, physical and virtual computing resources in the enterprise system 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The microservices database 108 may be any type of database configured to store information related to microservices design for applications hosted on assets of the enterprise system 110. Such information may include, by way of example, application logs including information characterizing function calls between the functions of applications that are to be disintegrated or otherwise converted into a set of microservices. The information may also include proposed designs for sets of microservices, generic microservices features to be added to created microservices, etc.

The microservices database 108 in some embodiments is implemented using one or more storage systems or devices associated with the microservices design recommendation tool 102. In some embodiments, one or more of the storage systems utilized to implement the microservices database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the microservices design recommendation tool 102, as well as to support communication between the microservices design recommendation tool 102 and other related systems and devices not explicitly shown.

In some embodiments, the client devices 104 may implement host agents that are configured for communication with the microservices design recommendation tool 102. The host agents implemented by the client devices 104 may be configured to interact with a graphical user interface and visualizations thereof that are produced by the microservices design recommendation tool 102. The host agents may permit users of the client devices 104 to interact with user interface features of the graphical user interface to modify proposed designs of microservices for one or more applications, to select microservices to be created, to deploy created microservices, etc.

It should be noted that a "host agent" as this term is generally used herein may comprise an automated entity, such as a software entity running on a processing device. Accordingly, a host agent need not be a human entity.

Although shown as separate from the client devices 104 and the enterprise system 110 in the FIG. 1 embodiment, it should be appreciated that the microservices design recommendation tool 102 may be implemented at least in part within one or more of the client devices 104 or at least in part within the enterprise system 110, or combinations thereof, in some embodiments.

The microservices design recommendation tool 102 in the FIG. 1 embodiment is assumed to be implemented using at least one processing device. Each such processing device generally comprises at least one processor and an associated memory, and implements one or more functional modules for controlling certain features of the microservices design recommendation tool 110. In the FIG. 1 embodiment, the microservices design recommendation tool 102 implements an application parsing module 112, a function visualization module 114, a microservice recommendation module 116 and a microservice generation module 118.

The microservices design recommendation tool 102 is configured to identify at least a portion of an application that is to be converted (e.g., "disintegrated") into a set of microservices. The application parsing module 112 is configured to analyze software code of the application to identify a plurality of functions as candidates for combination with one another into the set of microservices, and to monitor a running instance of the application (e.g., on one or more assets of the enterprise system 110) to generate a calling-context tree identifying interactions among the plurality of functions. The function visualization module 114 is configured to provide a visualization of the generated calling-context tree via a graphical user interface of the microservices design recommendation tool 102, with the graphical user interface providing user interface features for users of the client devices 104 to modify a recommended design for the set of microservices that is created by the microservice recommendation module 116. The recommended design for the set of microservices is based at least in part on the identified interactions among the plurality of functions. The microservice generation module 118 is configured to generate the set of microservices based at least in part on the modified design.

It is to be appreciated that the particular arrangement of the microservices design recommendation tool 102, the application parsing module 112, the function visualization module 114, the microservice recommendation module 116, and the microservice generation module 118 illustrated in the FIG. 1 embodiment is presented by way of example only, and alternative arrangements can be used in other embodiments. As discussed above, for example, the microservices design recommendation tool 102, the application parsing module 112, the function visualization module 114, the microservice recommendation module 116, and the microservice generation module 118 may in some embodiments be implemented internal to one or more of the client devices 104, the enterprise system 110, or combinations thereof. As another example, the functionality associated with the application parsing module 112, the function visualization module 114, the microservice recommendation module 116, and the microservice generation module 118 may be combined into fewer modules, or separated across more modules with the multiple modules possibly being implemented with multiple distinct processors or processing devices.

At least portions of the application parsing module 112, the function visualization module 114, the microservice recommendation module 116, and the microservice generation module 118 may be implemented at least in part in the form of software that is stored in memory and executed by a processor.

It is to be understood that the particular set of elements shown in FIG. 1 for the design of microservices for applications is presented by way of illustrative example only, and in other embodiments additional or alternative elements may be used. Thus, another embodiment may include additional or alternative systems, devices and other network entities, as well as different arrangements of modules and other components.

The microservices design recommendation tool 102 and other portions of the system 100 may be part of cloud infrastructure as will be described in further detail below. The cloud infrastructure hosting the microservices design recommendation tool 102 may also host one or more of the client devices 104, the microservices database 108 and the enterprise system 110.

The microservices design recommendation tool 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The microservices design recommendation tool 102, client devices 104, microservices database 108 and enterprise system 110 or components thereof may be implemented on respective distinct processing platforms, although numerous other arrangements are possible. For example, in some embodiments at least portions of the microservices design recommendation tool 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the microservices design recommendation tool 102, client devices 104, microservices database 108, enterprise system 110, or portions or components thereof, to reside in different data centers. Numerous other distributed implementations are possible. The microservices design recommendation tool 102 or portions thereof can also be implemented in a distributed manner across multiple data centers.

Additional examples of processing platforms utilized to implement the microservices design recommendation tool 102 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

An exemplary process for designing microservices for applications will now be described in more detail with reference to the flow diagram of FIG. 2. It is to be understood that this particular process is only an example, and that additional or alternative processes for designing microservices for applications may be used in other embodiments.

In this embodiment, the process includes steps 200 through 210. These steps are assumed to be performed by the microservices design recommendation tool 102 utilizing the application parsing module 112, the function visualization module 114, the microservice recommendation module 116 and the microservice generation module 118. The process begins with step 200, identifying at least a portion of an application to be converted into a set of microservices. In some embodiments, the application is a "legacy" application that is being converted into a cloud native application. In step 202, the software code of the application is analyzed to identify a plurality of functions as candidates for combination with one another into the set of microservices. Step 202 may include finding functions in the software code of the application, determining whether each of the found functions references one or more external services, and selecting ones of the found functions that reference at least one of the one or more external services as the candidates for combination with one another into the set of microservices. The one or more external services may comprise at least one of a web service, a database interface and a network protocol. In step 204, a running instance of the application is monitored to generate a calling-context tree identifying interactions among the plurality of functions.

Figure 2:
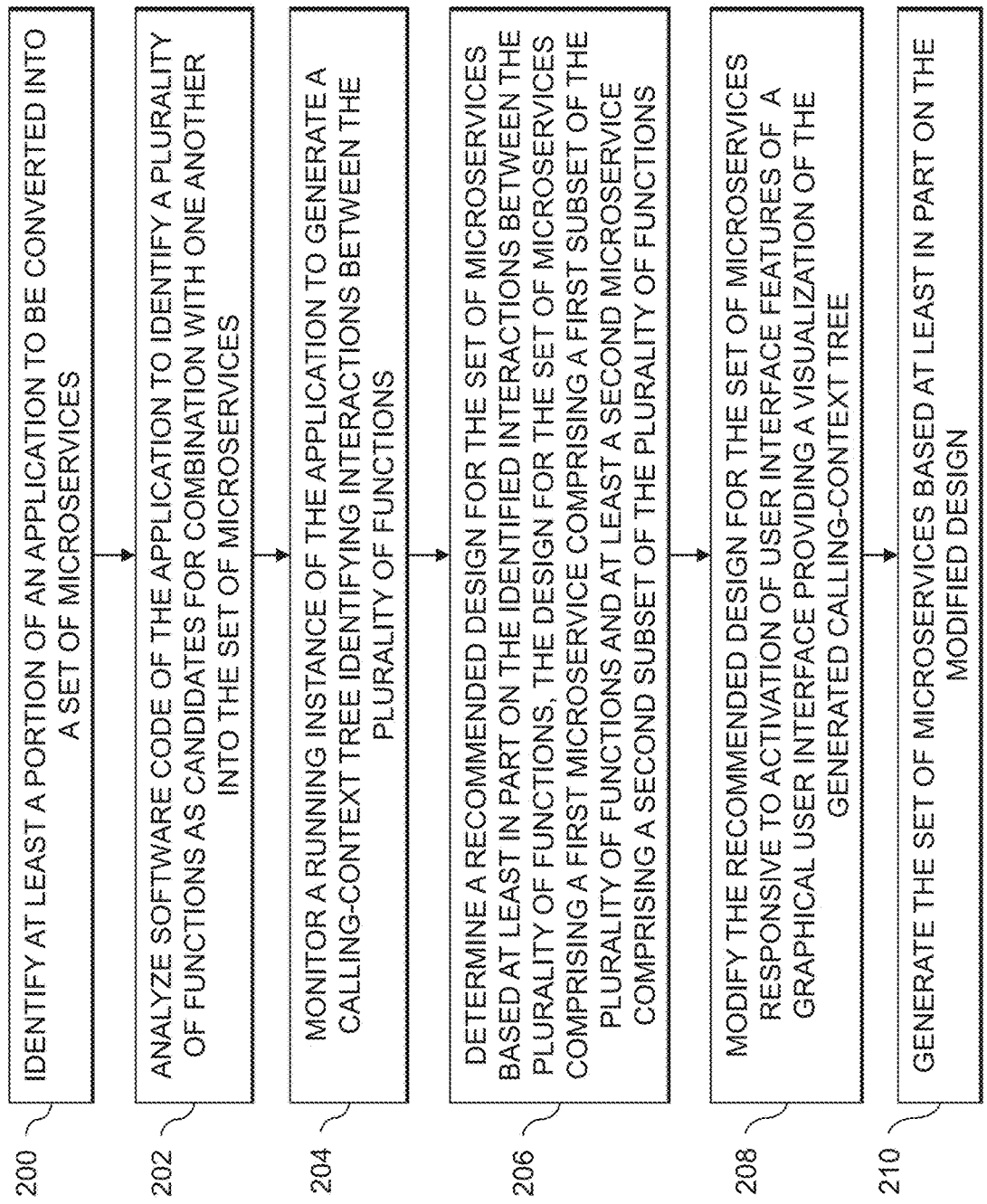
FIG. 2 is a flow diagram of an exemplary process for designing microservices for applications in an illustrative embodiment.
Figure 3A:
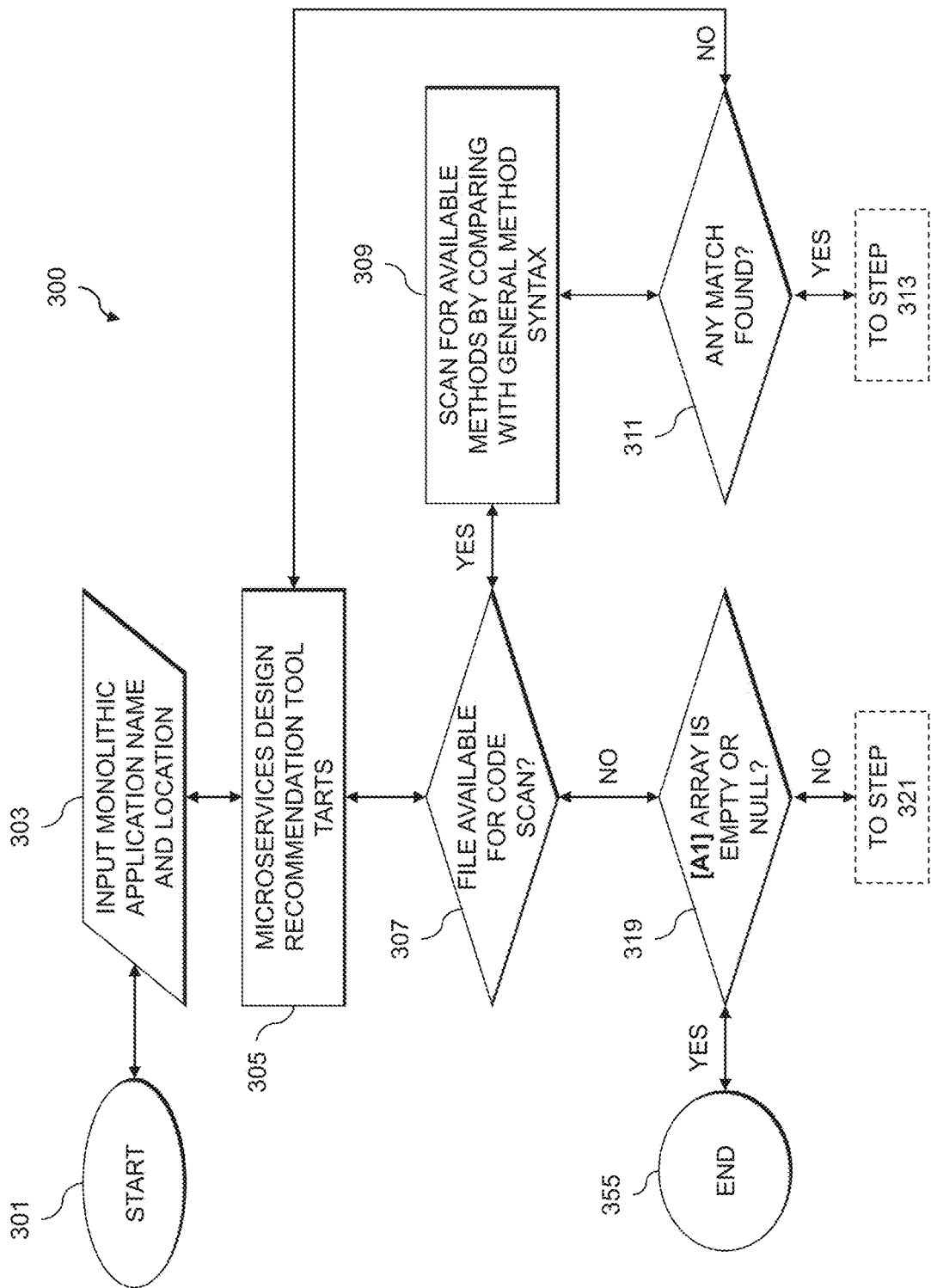
FIGS. 3A-3E depict a process for deconstructing a monolithic application into microservices in an illustrative embodiment.
Figure 3B:
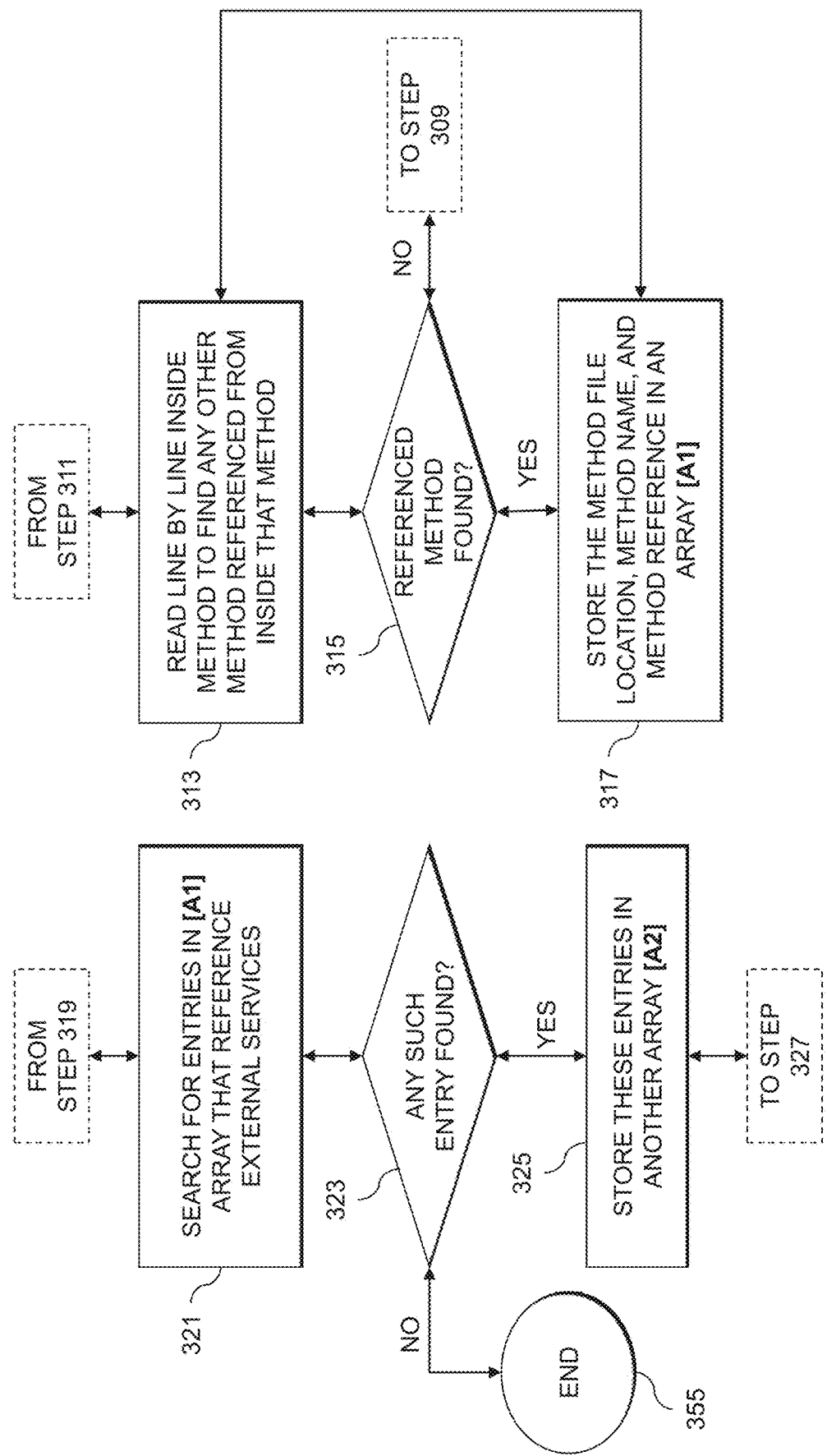
Figure 3C:
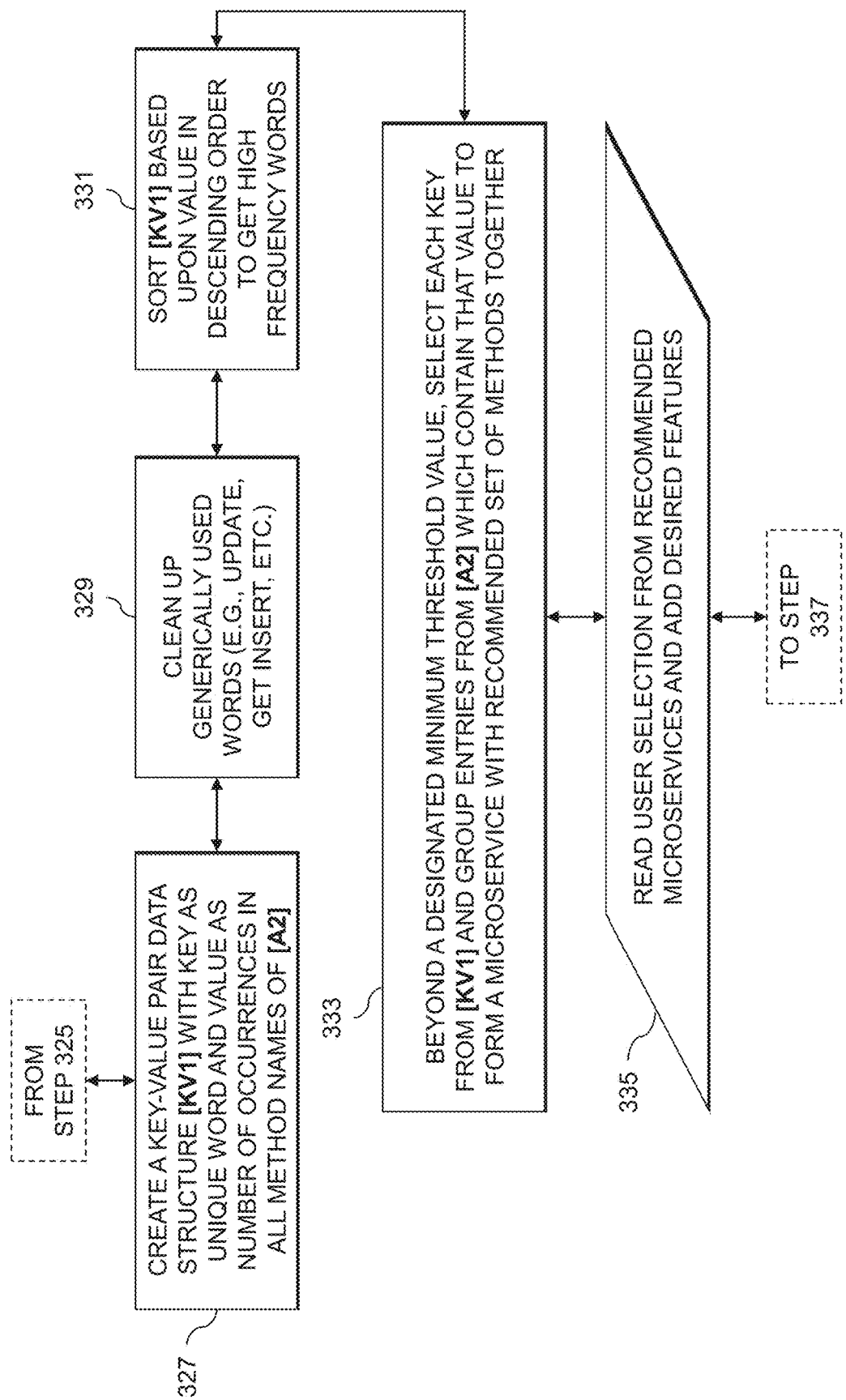
Figure 3D:
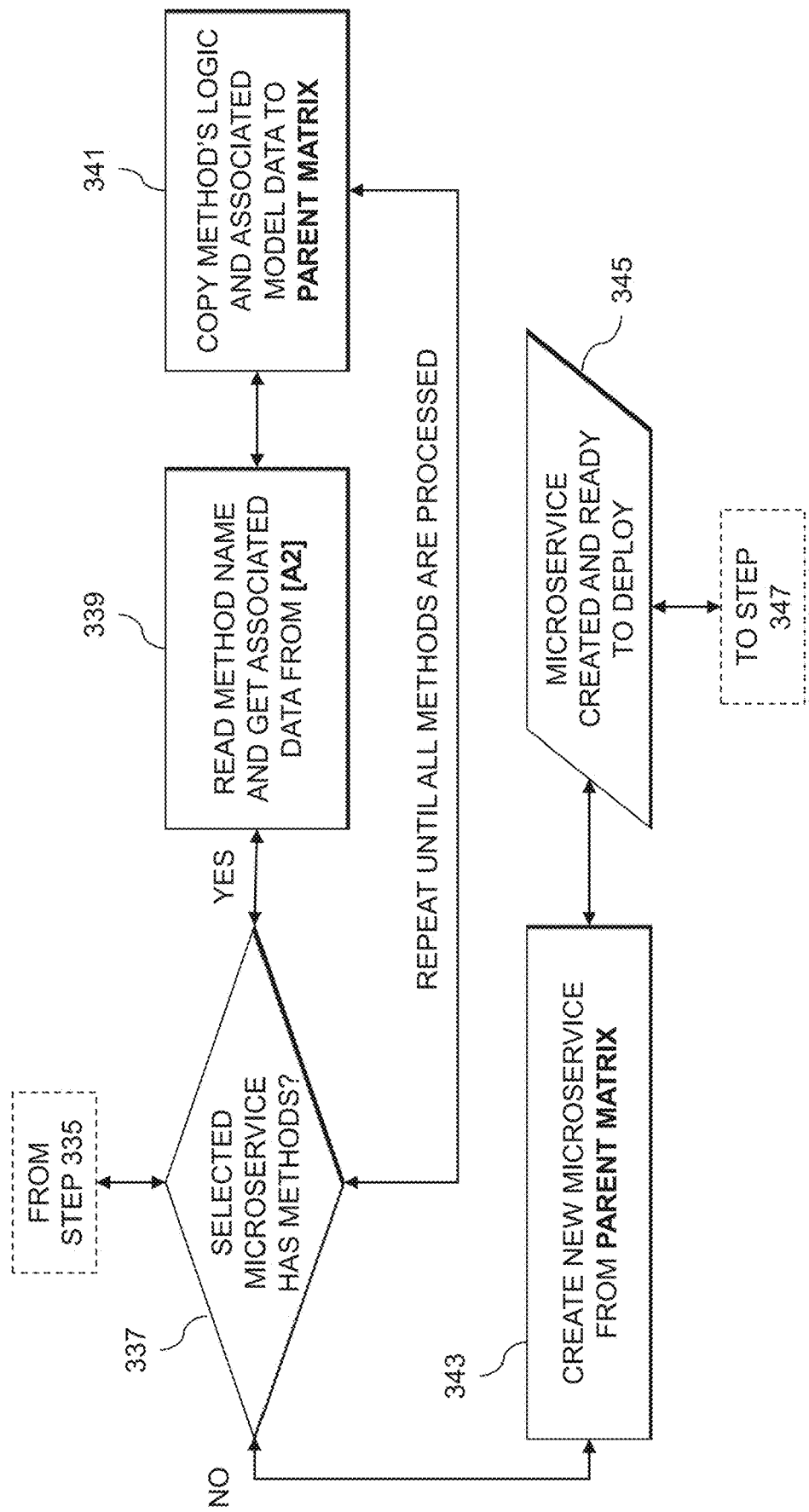
Figure 3E:
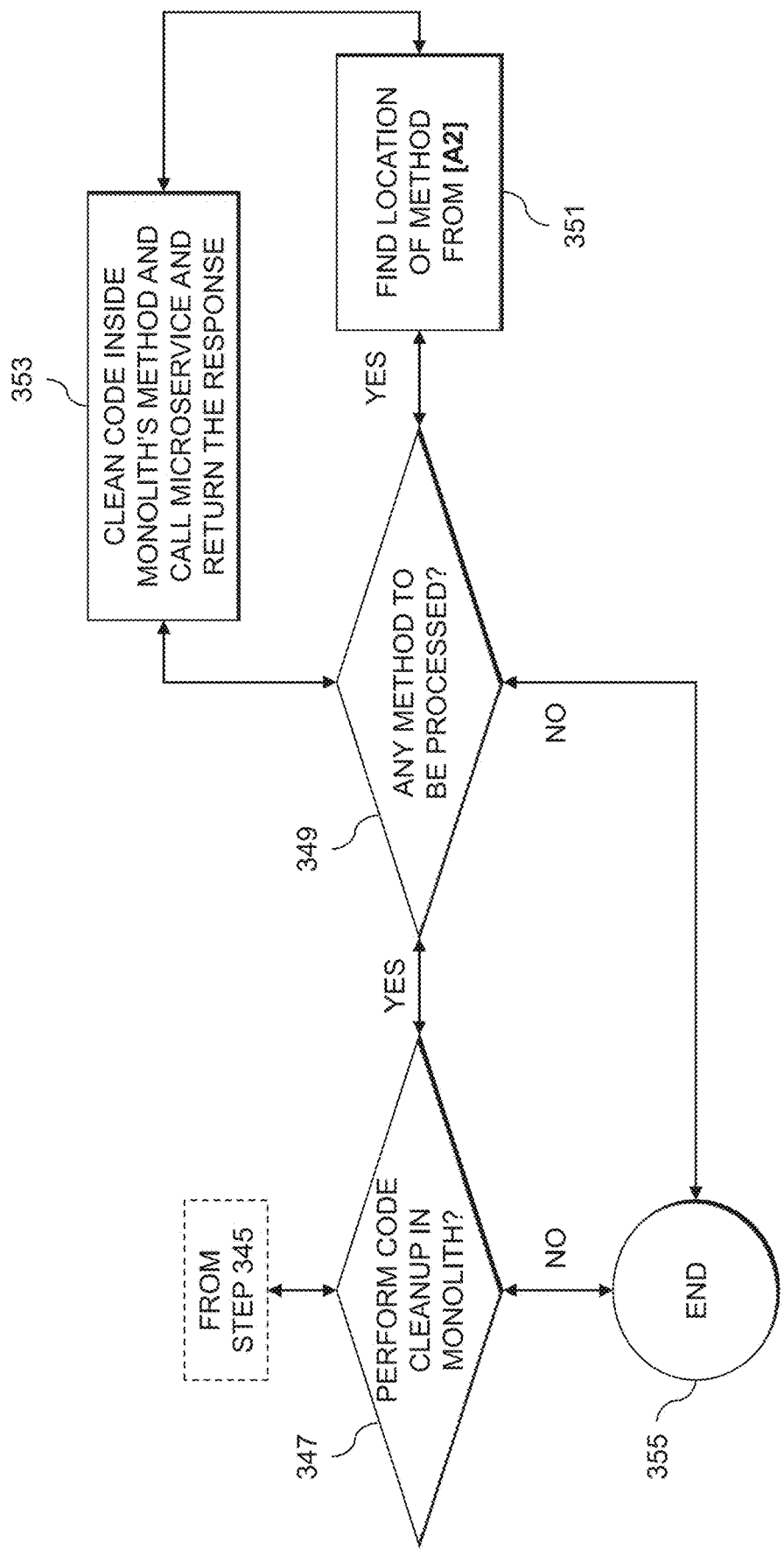

The FIG. 2 process continues with determining a recommended design for the set of microservices in step 206 based at least in part on the identified interactions among the plurality of functions. The design for the set of microservices comprises a first microservice comprising a first subset of the plurality of functions and at least a second microservice comprising a second subset of the plurality of functions. Step 206 may comprise grouping the first subset of the plurality of functions into the first microservice based at least in part on identifying that each of the functions in the first subset of the plurality of functions shares a first common characteristic, and grouping the second subset of the plurality of functions into the second microservice based at least in part on identifying that each of the functions in the second subset of the plurality of functions shares a second common characteristic. Identifying that each of the functions in the first subset of the plurality of functions shares the first common characteristic and identifying that each of the functions in the second subset of the plurality of functions shares the second common characteristic comprises at least one of: performing a lexical analysis of function names of the plurality of functions, the first common characteristic comprising at least a first common keyword in function names of each of the functions in the first subset and the second common characteristic comprising at least a second common keyword in function names of each of the functions in the second subset; and determining amounts of function calls between respective ones of the plurality of functions while monitoring the running instance of the application, the first common characteristic comprising at least a first designated threshold amount of function calls among the first subset of the plurality of functions and the second common characteristic comprising at least a second designated threshold amount of function calls among the second subset of the plurality of functions.

In step 208, the recommended design for the set of microservices is modified responsive to activation of user interface features of a graphical user interface providing a visualization of the generated calling-context tree. The graphical user interface provides the user interface features for modifying the recommended design for the set of microservices. The visualization of the generated calling-context tree may comprise nodes representing respective ones of the plurality of functions and edges connecting the nodes representing function calls among the plurality of functions. A given one of the user interface features may enable selection of one or more of the nodes of the generated calling-context tree and modification of an association of the selected one or more nodes with one or more of the set of microservices. Modifying the association of the selected one or more nodes may comprise at least one of: changing the selected one or more nodes from not being associated with any of the set of microservices to being associated with one of the set of microservices; changing the selected one or more nodes from being associated with one of the set of microservices to not being associated with any of the set of microservices; and changing the selected one or more nodes from being associated with the first microservice to the second microservice.

The FIG. 2 process continues with generating the set of microservices based at least in part on the modified design in step 210. Step 210 may comprise, for a given one of the set of microservices, adding one or more generic microservice features to the given microservice. The one or more generic microservice features may comprise a function for at least one of automatic deployment of the given microservice, interfacing the given microservice with a database, performing a health check of the given microservice, enabling exception handling for the given microservice, logging activity of the given microservice, providing performance data of the given microservice, and providing automatic document generation. Step 210 may comprise, for a given one of the set of microservices comprising a given subset of the plurality of functions, replacing software code of the given subset of the plurality of functions from the application with one or more references to the given microservice.

The microservices design recommendation tool 102 provides functionality for visually and associatively designing microservices based on various characteristics of a monolithic application's code and behavior. The microservices design recommendation tool 102 may construct a calling-context tree from profile data that is obtained via a dry-run of the monolithic application. The calling-context tree is a context-sensitive call graph or control flow graph which represents calling relationships between functions or subroutines in the monolithic application. In the calling-context tree, nodes represent functions of the monolithic application and an edge connecting a first function's node to a second function's node indicates that the first function calls the second function. In some embodiments, a miniaturized calling-context tree is used, which is formed using a custom algorithm described below.

The microservices design recommendation tool 102 generates an initial microservice design that considers keyword features in the source code (e.g., as described in further detail below with respect to the flow diagram of FIGS. 3A-3E) and the amounts of function calls between components. The microservices design recommendation tool 102 then provides an interactive user interface that allows users to refine the initial microservice design, such as by taking multiple-choice actions to reconstruct the boundaries of microservices in the design while considering expected calls between the microservices (e.g., as visualized using the calling-context tree). This design will have significant positive impact on runtime performance.

FIGS. 3A-3E depict a process 300 for deconstructing a monolithic application into microservices using a semantic-based approach. To start 301, a monolithic application is selected by a user, such as via inputting a monolithic application name and location in step 303. A monolithic application may be implemented using various programming languages (e.g., C#, Python, Java, etc.). The monolithic application may also be implemented using various architectures (e.g., the monolithic application may be on a single platform, be divided on different platforms with each part having the same characteristics as the general monolithic application, etc.). Given the monolithic application name and location, a microservices design recommendation tool (e.g., 102) starts in 305 to disintegrate the selected monolithic application into a set of microservices by fetching the code of the monolithic application (e.g., from an application database or other data source).

The process 300 proceeds to step 307, where a determination is made as to whether a file of the monolithic application is available for code scanning (e.g., whether there are any code files or code of the monolithic application not yet scanned). If the result of the step 307 determination is yes, the process 300 continues with step 309 and scans for available methods (e.g., to find candidates for nanoservices) by comparing against some general method or function syntax that is pre-defined within the microservices design tool. For example, if the monolithic application is written in the Java programming language, a method may be found by searching the code for the format or syntax of <modifier> <return type> <method name>(parameters . . . ) { . . . }. For other languages, an appropriate general method syntax may be used to find one or more methods in step 309.

In step 311, a determination is made as to whether any matches are found in step 309. If no matches are found, the process 300 returns to step 305. If matches are found, the process 300 continues to step 313, where the code is read line-by-line inside a given method to find any other methods referenced from inside the given method. Step 313, in some embodiments, scans inside of the given method to determine whether the given method calls another internal method. If the given method calls another method which is defined internally in the monolithic application, then the given method has a dependency on another method and is not suitable for a nanoservice, which is assumed to be individual and standalone. In step 315, a determination is made as to whether any referenced methods are found. If the result of the step 315 determination is yes, the method file location, method name and method references are stored in a two-dimensional array [A1] in step 317 and the process 300 returns to step 313. The array [A1], also referred to as a reference array, provides a repository to store methods (e.g., method names and associated code). If the result of the step 315 determination is no, the process 300 returns to step 309.

The processing flow of steps 307 through 317 is repeated until the decision step 307 ends in no, whereby the process 300 moves to step 319. In step 319, a determination is made as to whether the [A1] array is empty or null. If yes, the process 300 ends in step 355. If no, the process 300 proceeds to step 321. In step 321, entries in array [A1] are searched to analyze their referenced methods to see if any of the entries is a method that calls an external service. If a method does not call another internal method but calls an external service, the method becomes a candidate for a nanoservice. An external service may be a method to call a web service, a database interface to fetch or insert data into a database, a network protocol to transmit data over a network, etc. It should be appreciated, however, that various other external services may be scanned for in step 321.

In step 323, a determination is made as to whether any such entries in the [A1] array are found. If no, the process 300 ends in step 355. If yes, the process 300 proceeds to step 325 where such entries are stored in another array [A2]. The array [A2], also referred to as a nanoservice candidate array, stores methods which are suitable candidates for nanoservices. The process 300 then continues with step 327, where a key-value pair data structure [KV1] is created, with the key as a unique word and the value as number of occurrences of that unique word in all method names of the methods stored in array [A2]. Each of the methods in [A2] is assumed to include one or more keywords in its method name. For example, the array [A2] may include methods with names such as GetUsername, GetOrdername, UpdateOrdername, etc. Unique words such as Get, Username, Ordername, Update would thus be inserted into [KV1]. In step 329, cleanup of [KV1] is performed to remove generically used words (e.g., get, update, delete) that should not be considered as keywords. The microservices design tool may utilize a dictionary of generic terms for processing in step 329. In step 331, [KV1] is sorted based on the values in descending order, so as to identify high frequency words in the method names of candidate nanoservices from array [A2].

In step 333, each key from [KV1] that meets some minimum threshold is selected, and associated entries from array [A2] which contain that value are grouped to form a recommendation for forming a microservice. It should be noted that, in some embodiments, methods are not limited to being grouped together solely based on keywords in method or function names. As will be described in further detail below, the application may be analyzed at runtime to generate a calling-context tree for grouping methods or functions into proposed microservices in addition to or in place of using keyword-based approaches. More generally, methods or functions of a monolithic application may be grouped into proposed microservices based on any desired shared characteristics, including combinations of keywords in method or function names, calling-context tree edges, etc.

In step 335, the microservices design tool receives user selection of one or more microservices to create from the proposed set of microservices and adds desired features to such microservices. For example, the microservices design tool can add code for various generic functionalities, for automatic deployment, for interfacing to a database shared amongst nanoservices of a given microservice, etc.

Examples of generic functionalities for a microservice include, but are not limited to, features for exception handling, application logging, APIs for health checks and other types of performance monitoring, automatic document generation, database server configuration, etc.

To create the microservice selected in step 335, the process 300 proceeds to step 337 where a determination is made as to whether the selected microservice has any methods to be added. If yes, the method name is read and its associated data is obtained from [A2] in step 339. In step 341, that method's logic and associated model data is copied to a parent matrix, after which the process 300 returns to step 337 until all methods are processed. When all methods are processed (e.g., when the result of step 337 is no), the process 300 continues with step 343 where a new microservice is created from the parent matrix. In step 345, the newly created microservice is ready to deploy.

In step 347, a determination is made as to whether to perform code cleanup in the monolithic application after creating the new microservice. If the result of the step 347 determination is no, the process 300 ends in step 355. If the result of the step 347 determination is yes, the process 300 proceeds to determining whether any methods from the newly created microservice need to be processed for cleanup in step 349. If the result of the step 349 determination is no, then the process 300 ends in step 355. If the result of the step 349 determination is yes, then the location of the method to be processed is found from the array [A2] in step 351. In step 353, the code inside the monolithic application (e.g., at the location found in step 351) is cleaned and a call and response to the newly created microservice is inserted.

Figure 4:
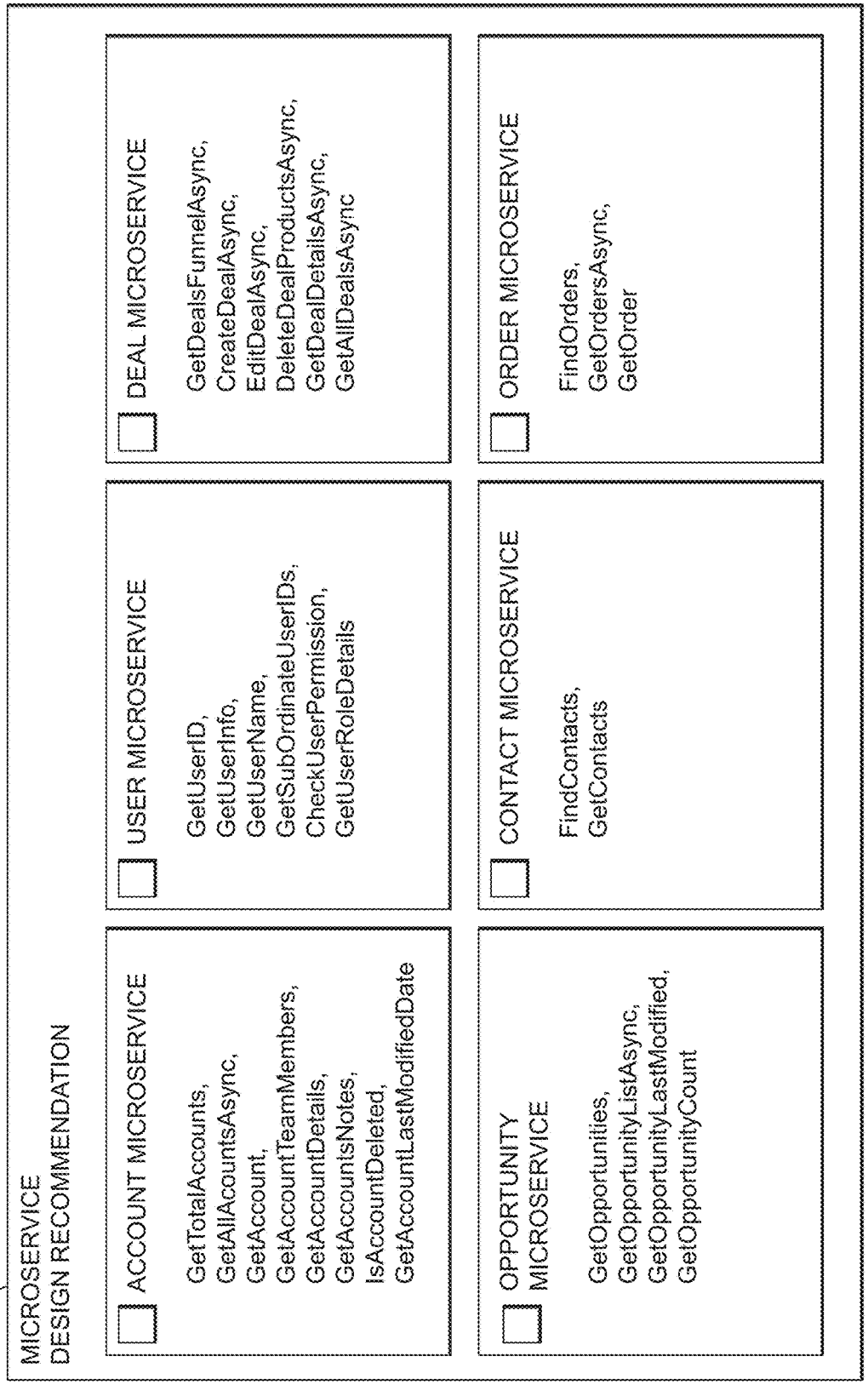
FIG. 4 is an example of a microservices design recommendation for a monolithic application in an illustrative embodiment.

FIG. 4 is an example of a microservices design recommendation 400 for a monolithic application. The microservices design recommendation 400 takes into account or considers only function names statically (e.g., it assumes that function names with common keywords are related and are thus suitable for forming a microservice). Such an approach can suffer from various disadvantages, as the assumption that function names with common keywords are related may not always hold true. For example, a large monolithic application may contain software code that is written by multiple different developers, each of which uses different naming conventions for functions in the code. Further, such an approach does not give a real-time view of the interactions among functions of the monolithic application and does not provide the flexibility to re-group functions into different microservices if required or desired.

Figure 5A:
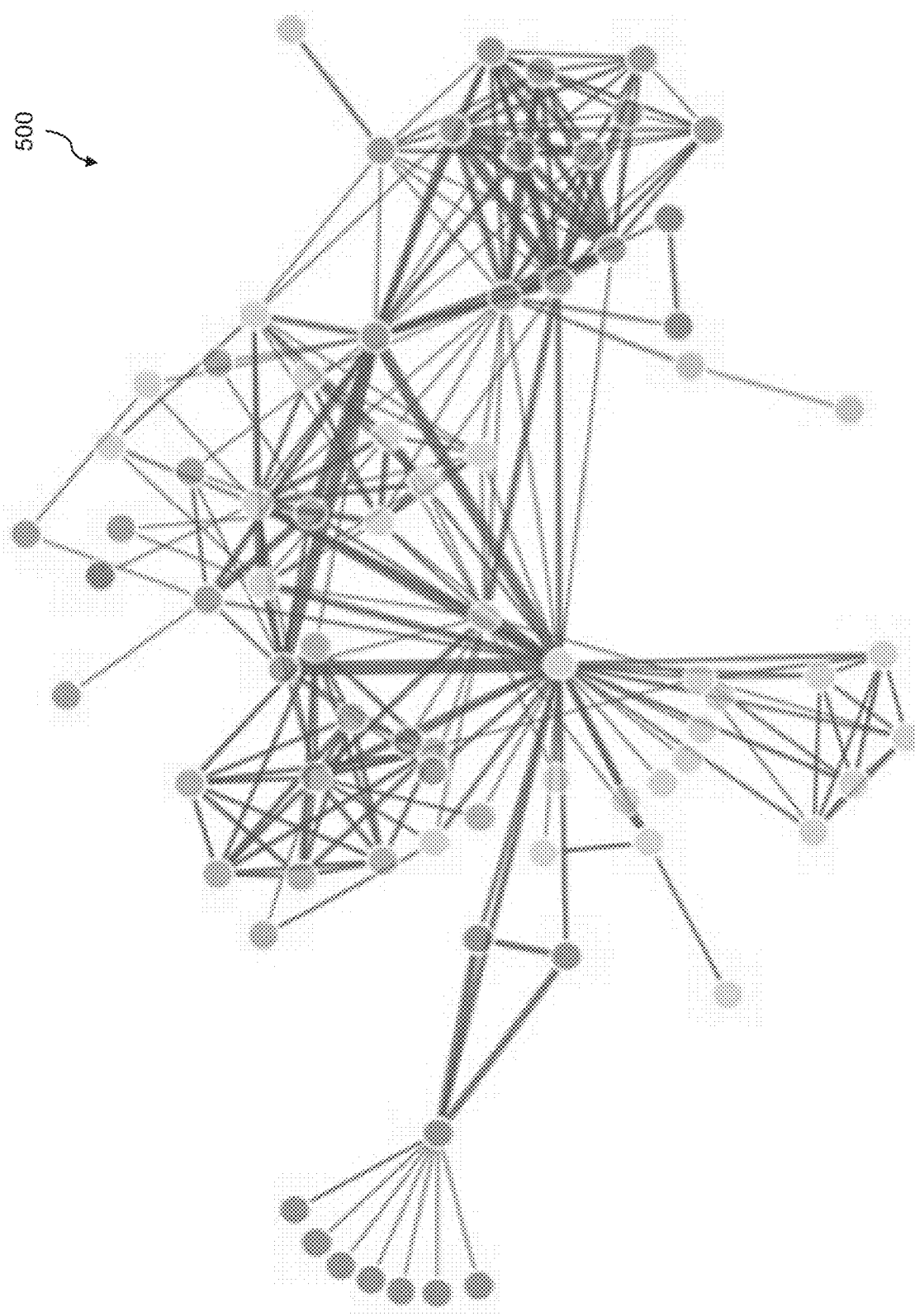
FIGS. 5A and 5B show user interface visualizations of a calling-context tree for functions of a monolithic application in an illustrative embodiment.
Figure 5B:
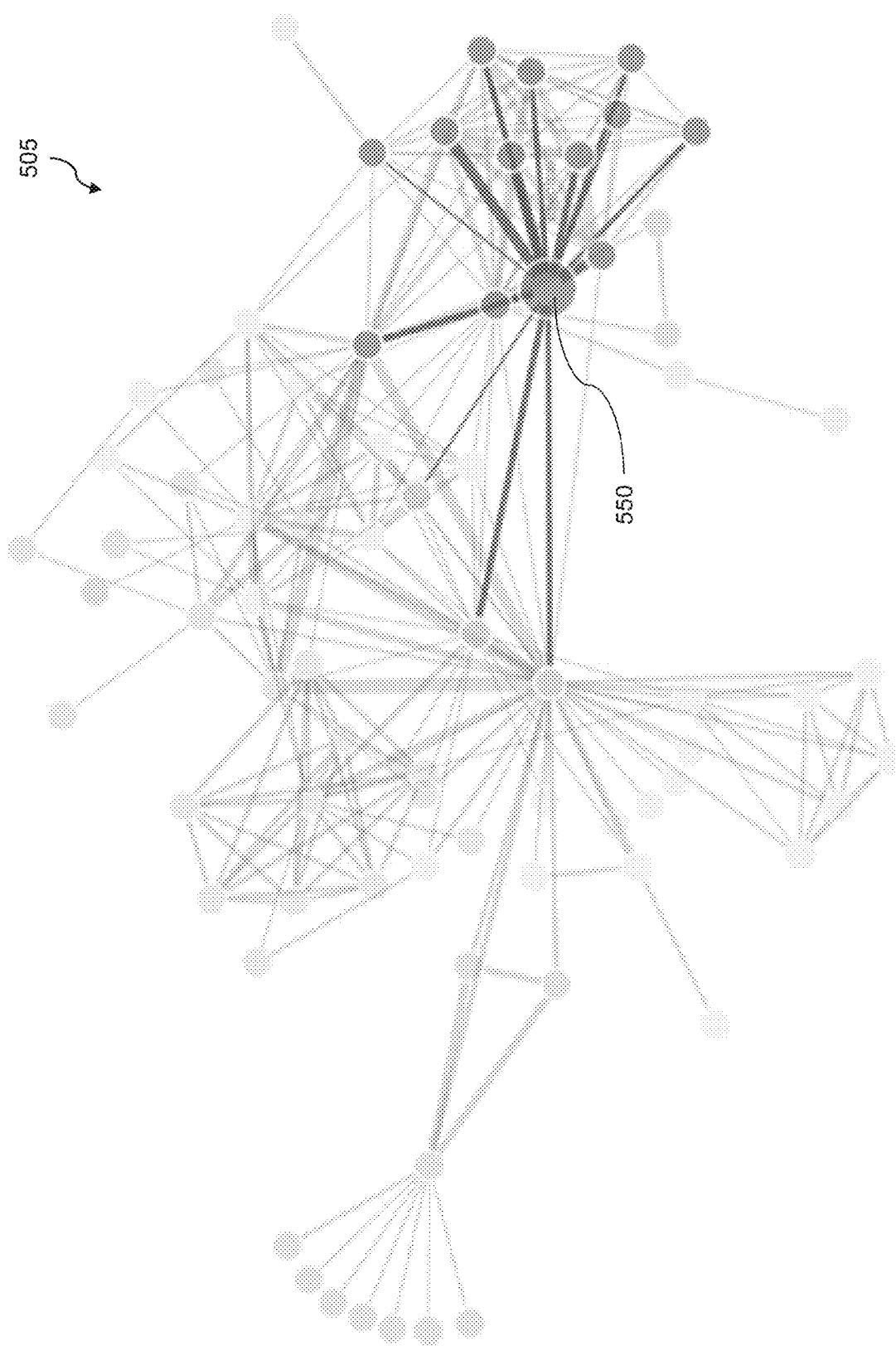

FIGS. 5A and 5B show user interface visualizations 500 and 505, respectively, of a calling-context tree of functions of a monolithic application in an illustrative embodiment. More particular, the visualization 500 of FIG. 5A shows a snippet from a web-based user interface provided by the microservices design recommendation tool 102. The visualization 500 is advantageously dynamic and detailed relative to the microservices design recommendation 400 shown in FIG. 4. While the microservices design recommendation 400 included just six microservice candidates, the visualization 500 includes a visually appealing calling-context tree graph where functions are represented by circular nodes, and calls between functions are represented as edges connecting the nodes.

The nodes in the visualization 500 may vary in color based on the keyword names (e.g., the functions grouped together in the six proposed microservices of the microservices design recommendation 400 may be represented as nodes of the same color). While the visualization 500 is shown in grayscale (e.g., where differing shades of gray denote functions that are proposed for grouping into different microservices), it should be appreciated that different colors may be used rather than differing shades of gray, or different node shapes may be used rather than or in addition to differing shades of gray or different colors. The visualization 500 assists users to identify the kinds of interactions that the proposed microservices will have, both within each proposed microservice and between different proposed microservices.

In addition to showing proposed microservices (e.g., each proposed microservice comprises nodes in the same shade of gray), the visualization 500 may be used to identify areas and gives users the possibility to improve upon the suggested or proposed microservices as well. For example, in the visualization 500 each of the nodes may be user-selectable. Upon selecting a given one of the nodes (or a group of nodes), user interface features enable the user to see details about that node or nodes, such as its associated function name(s), statistics about the function(s), the proposed microservice for those function(s), etc. User interface features can also enable the user to change the proposed microservice for the function of a particular node or group of nodes.

The visualization 505 of FIG. 5B illustrates such selection of an area or region within the visualization 500. After highlighting a particular node 550, the visualization 505 highlights all the functions or methods that the function of node 550 contacts with. As illustrated in visualization 505, the width of a vertex or edge between the node 550 and other nodes of the visualization 505 may be dynamic in nature, reflecting how much interaction happens on average (e.g., based on data from logs and analytics obtained during runtime of the monolithic application). This helps the user to analyze the proposed disintegration of the monolithic application into a set of microservices, to illustrate how tightly coupled with one another different microservices are from the same monolithic application. This concept may also be extended to create an organization-wide or enterprise-wide communication graph between all of its deployed microservices (e.g., which may have been disintegrated from multiple different monolithic applications). The visualization 505 may further provide user interface features that allow a user to "drag-and-drop" or otherwise modify the microservice to which a particular function or functions are assigned.

Illustrative embodiments provide various advantages. In some embodiments, microservices are designed while considering both service granularity and runtime performance, along with using keyword-based approaches in source code. Calling-context based visualizations allow users to refine the design of microservices in an intuitive way via various capabilities such as: creating new microservices with selected classes or functions; moving selected classes or functions into different microservices; cloning selected classes or functions into all microservices that communicate with the selected classes or functions; etc. The calling-context visualizations further advantageously represent communication between functions by dynamically increasing the width of edges between the functions of microservices. This functionality, in some embodiments, can be extended further for adoption in organization-wide or enterprise wide analytics of a microservice's degrees of freedom. Further, calling-context based clustering methods provide function-level clustering that can put functions of the same class into different microservices. Approaches which rely solely on semantic-based clustering cannot do so, as in such approaches all functions of a class (e.g., with a common keyword) are put into the same microservice.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for designing microservices for applications will now be described in greater detail with reference to FIGS. 6 and 7. Although described in the context of system 100, these platforms may also be used to implement at least portions of other information processing systems in other embodiments.

Figure 6:
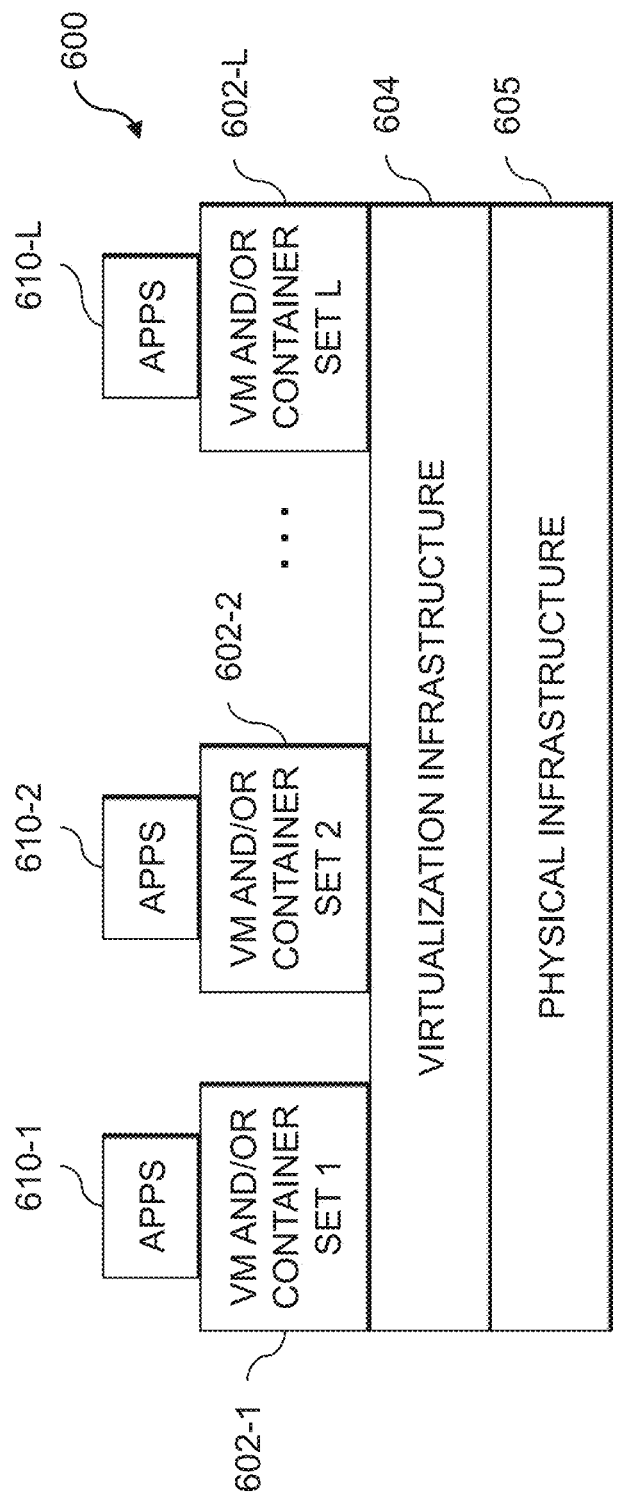
FIGS. 6 and 7 show examples of processing platforms that may be utilized to implement at least a portion of an information processing system in illustrative embodiments.
Figure 7:
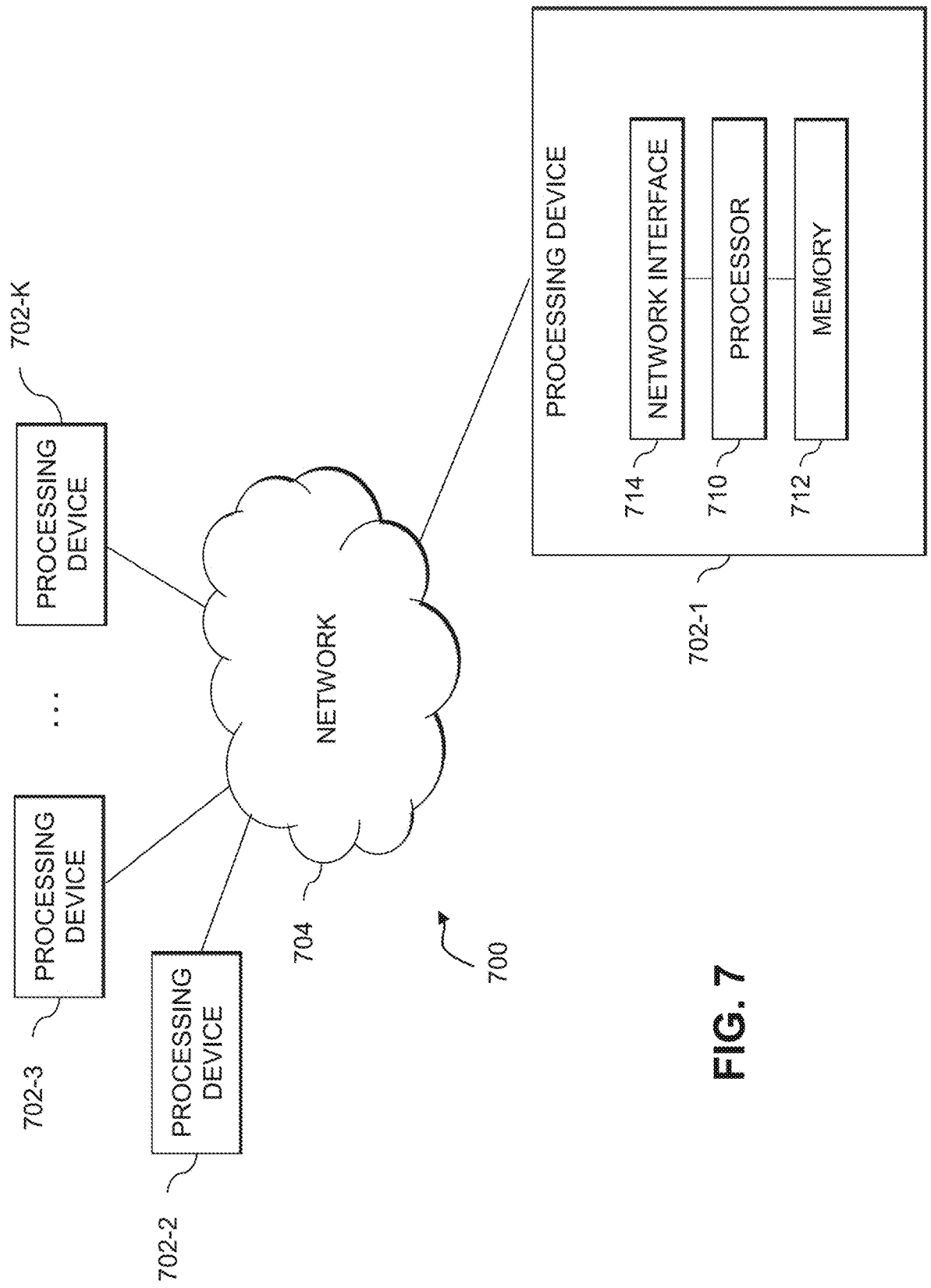

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 504 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for designing microservices for applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, applications, microservices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
    identifying at least a portion of an application to be converted into a set of microservices;
    analyzing software code of the application to identify a plurality of functions as candidates for combination with one another into the set of microservices;
    generating a key-value pair data structure comprising one or more key-value pairs, each key-value pair comprising a key representing a given common characteristic shared by at least a subset of the plurality of functions and a value representing a number of different ones of the plurality of functions sharing the given common characteristic;
    monitoring a running instance of the application to generate a calling-context tree identifying interactions among the plurality of functions;
    determining a recommended design for the set of microservices based at least in part on the identified interactions among the plurality of functions and the key-value pair data structure, the recommended design for the set of microservices comprising a first microservice comprising a first subset of the plurality of functions having at least a first common characteristic corresponding to a first key-value pair in the key-value pair data structure that has a first value exceeding a designated threshold and at least a second microservice comprising a second subset of the plurality of functions having at least a second common characteristic corresponding to a second key-value pair in the key-value pair data structure that has a second value exceeding the designated threshold;
    modifying the recommended design for the set of microservices responsive to activation of user interface features of a graphical user interface providing a visualization of the generated calling-context tree, wherein modifying the recommended design comprises at least one of: (i) adding one or more functions to at least one of the first and second subsets of the respective first and second microservices; and (ii) removing one or more functions from at least one of the first and second subsets of the respective first and second microservices; and
    generating the set of microservices based at least in part on the modified design;
    wherein the method is performed by at least one processing device comprising a processor coupled to a memory.

2. The method of claim 1 wherein analyzing software code of the application to identify the plurality of functions as the candidates for combination with one another into the set of microservices comprises:
    finding functions in the software code of the application;
    determining whether each of the found functions references one or more external services; and
    selecting one or more of the found functions that reference at least one of the one or more external services as the candidates for combination with one another into the set of microservices.

3. The method of claim 2 wherein the one or more external services comprise at least one of a web service, a database interface and a network protocol.

4. The method of claim 1 wherein determining the recommended design for the set of microservices comprises:
    grouping the first subset of the plurality of functions into the first microservice based at least in part on identifying that each of the functions in the first subset of the plurality of functions shares the first common characteristic; and
    grouping the second subset of the plurality of functions into the second microservice based at least in part on identifying that each of the functions in the second subset of the plurality of functions shares the second common characteristic.

5. The method of claim 4 wherein identifying that each of the functions in the first subset of the plurality of functions shares the first common characteristic and identifying that each of the functions in the second subset of the plurality of functions shares the second common characteristic comprises performing a lexical analysis of function names of the plurality of functions.

6. The method of claim 5 wherein the first common characteristic comprises at least a first common keyword in function names of each of the functions in the first subset and the second common characteristic comprises at least a second common keyword in function names of each of the functions in the second subset.

7. The method of claim 1 wherein determining the recommended design for the set of microservices comprises grouping the first subset of the plurality of functions into the first microservice and grouping the second subset of the plurality of functions into the second microservice based at least in part on determining amounts of function calls between respective ones of the plurality of functions while monitoring the running instance of the application.

8. The method of claim 7 wherein grouping the first subset of the plurality of functions into the first microservice is responsive to determining at least a first designated threshold amount of function calls among the first subset of the plurality of functions and grouping the second subset of the plurality of functions into the second microservice is responsive to determining at least a second designated threshold amount of function calls among the second subset of the plurality of functions.

9. The method of claim 1 wherein the visualization of the generated calling-context tree comprises nodes representing respective ones of the plurality of functions and edges connecting the nodes representing function calls among the plurality of functions.

10. The method of claim 9 wherein a given one of the user interface features of the graphical user interface enables selection of one or more of the nodes of the generated calling-context tree and modification of an association of the selected one or more nodes with one or more of the set of microservices.

11. The method of claim 10 wherein modifying the association of the selected one or more nodes comprises at least one of:
- changing the selected one or more nodes from not being associated with any of the set of microservices to being associated with one of the set of microservices;
- changing the selected one or more nodes from being associated with one of the set of microservices to not being associated with any of the set of microservices; and
- changing the selected one or more nodes from being associated with the first microservice to the second microservice.

12. The method of claim 1 wherein generating the set of microservices based at least in part on the modified design comprises, for a given one of the set of microservices, adding one or more generic microservice features to the given microservice.

13. The method of claim 12 wherein the one or more generic microservice features comprise a function for at least one of automatic deployment of the given microservice, interfacing the given microservice with a database, performing a health check of the given microservice, enabling exception handling for the given microservice, logging activity of the given microservice, providing performance data of the given microservice, and providing automatic document generation.

14. The method of claim 1 wherein generating the set of microservices based at least in part on the modified design comprises, for a given one of the set of microservices comprising a given subset of the plurality of functions, replacing software code of the given subset of the plurality of functions from the application with one or more references to the given microservice.

15. A computer program product comprising a non-transitory processor-readable storage medium having stored therein program code of one or more software programs, wherein the program code when executed by at least one processing device causes the at least one processing device to perform steps of:
- identifying at least a portion of an application to be converted into a set of microservices;
- analyzing software code of the application to identify a plurality of functions as candidates for combination with one another into the set of microservices;
- generating a key-value pair data structure comprising one or more key-value pairs, each key-value pair comprising a key representing a given common characteristic shared by at least a subset of the plurality of functions and a value representing a number of different ones of the plurality of functions sharing the given common characteristic;
- monitoring a running instance of the application to generate a calling-context tree identifying interactions among the plurality of functions;
- determining a recommended design for the set of microservices based at least in part on the identified interactions among the plurality of functions and the key-value pair data structure, the recommended design for the set of microservices comprising a first microservice comprising a first subset of the plurality of functions having at least a first common characteristic corresponding to a first key-value pair in the key-value pair data structure that has a first value exceeding a designated threshold and at least a second microservice comprising a second subset of the plurality of functions having at least a second common characteristic corresponding to a second key-value pair in the key-value pair data structure that has a second value exceeding the designated threshold;
- modifying the recommended design for the set of microservices responsive to activation of user interface features of a graphical user interface providing a visualization of the generated calling-context tree, wherein modifying the recommended design comprises at least one of: (i) adding one or more functions to at least one of the first and second subsets of the respective first and second microservices; and (ii) removing one or more functions from at least one of the first and second subsets of the respective first and second microservices; and
- generating the set of microservices based at least in part on the modified design.

16. The computer program product of claim 15 wherein determining the recommended design for the set of microservices comprises:
- grouping the first subset of the plurality of functions into the first microservice based at least in part on identifying that each of the functions in the first subset of the plurality of functions shares the first common characteristic; and
- grouping the second subset of the plurality of functions into the second microservice based at least in part on identifying that each of the functions in the second subset of the plurality of functions shares the second common characteristic.

17. The computer program product of claim 16 wherein identifying that each of the functions in the first subset of the plurality of functions shares the first common characteristic and identifying that each of the functions in the second subset of the plurality of functions shares the second common characteristic comprises performing a lexical analysis of function names of the plurality of functions, the first common characteristic comprising function names of each of the functions in the first subset and the second common characteristic comprising function names of each of the functions in the second subset containing the second keyword.

18. An apparatus comprising:
- at least one processing device comprising a processor coupled to a memory;
- the at least one processing device being configured to perform steps of:
  - identifying at least a portion of an application to be converted into a set of microservices;
  - analyzing software code of the application to identify a plurality of functions as candidates for combination with one another into the set of microservices;
  - generating a key-value pair data structure comprising one or more key-value pairs, each key-value pair comprising a key representing a given common characteristic shared by at least a subset of the plurality of functions and a value representing a number of different ones of the plurality of functions sharing the given common characteristic;
  - monitoring a running instance of the application to generate a calling-context tree identifying interactions among the plurality of functions;
  - determining a recommended design for the set of microservices based at least in part on the identified interactions among the plurality of functions and the key-value pair data structure, the recommended design for the set of microservices comprising a first microservice comprising a first subset of the plurality of functions having at least a first common characteristic corresponding to a first key-value pair in the key-value pair data structure that has a first value exceeding a designated threshold and at least a second microservice comprising a second subset of the plurality of functions having at least a second common characteristic corresponding to a second key-value pair in the key-value pair data structure that has a second value exceeding the designated threshold;

modifying the recommended design for the set of microservices responsive to activation of user interface features of a graphical user interface providing a visualization of the generated calling-context tree, wherein modifying the recommended design comprises at least one of: (i) adding one or more functions to at least one of the first and second subsets of the respective first and second microservices; and (ii) removing one or more functions from at least one of the first and second subsets of the respective first and second microservices; and generating the set of microservices based at least in part on the modified design.

19. The apparatus of claim 18 wherein determining the recommended design for the set of microservices comprises:

grouping the first subset of the plurality of functions into the first microservice based at least in part on identifying that each of the functions in the first subset of the plurality of functions shares the first common characteristic; and grouping the second subset of the plurality of functions into the second microservice based at least in part on identifying that each of the functions in the second subset of the plurality of functions shares the second common characteristic.

20. The apparatus of claim 19 wherein identifying that each of the functions in the first subset of the plurality of functions shares the first common characteristic and identifying that each of the functions in the second subset of the plurality of functions shares the second common characteristic comprises performing a lexical analysis of function names of the plurality of functions, the first common characteristic comprising at least a first common keyword in function names of each of the functions in the first subset and the second common characteristic comprising at least a second common keyword in function names of each of the functions in the second subset.

* * * * *